March 16, 1965 T. D. NATHAN 3,173,694
GASKET

Filed Aug. 24, 1962 4 Sheets-Sheet 1

INVENTOR.
TRACY D. NATHAN
BY
*Gordon P. Mack*
ATTORNEY

INVENTOR.
TRACY D. NATHAN

INVENTOR.
TRACY D. NATHAN

ATTORNEY

March 16, 1965     T. D. NATHAN     3,173,694
GASKET

Filed Aug. 24, 1962     4 Sheets-Sheet 4

INVENTOR.
TRACY D. NATHAN
BY
ATTORNEY

United States Patent Office 3,173,694
Patented Mar. 16, 1965

3,173,694
GASKET
Tracy D. Nathan, Cuyahoga Falls, Ohio, assignor to Hamilton Kent Manufacturing Co., Kent, Ohio, a corporation of Ohio
Filed Aug. 24, 1962, Ser. No. 219,211
6 Claims. (Cl. 277—1)

This invention relates to an annular gasket of the type used between two pipes, such as at the bell of one pipe and spigot of another or between a sleeve and two pipes. The gasket is designed particularly for use in a pipe line carrying liquid under pressure, but may be used where the line is not subjected to internal pressure, and also where there is liquid outside of the pipe which may or may not be under pressure, as where the pipe is installed in a swamp or a body of water. In the latter case, the pipe may convey either a gas or a liquid.

The gasket for use between two pipes will be referred to herein as a single gasket, and the gasket for use between a sleeve and two pipes will be called a double gasket. Both gaskets are extruded from elastomeric material such as Neoprene, for example.

Considering first the single gasket, it comprises a base and an extensible portion which meet in slidable engagement at a mouth and enclose an annular hollow portion. Both the base and extensible portion extend forward from the mouth and usually terminate in two tapering lips which lie snug against the respective pipe surfaces. In the double gasket, and also sometimes in a single gasket with the base embedded in the pipe, there is no lip on the base portion. The base slopes forward from the bottom of said hollow to a ridge situated at the mouth of the gasket. The extensible portion is arched over the hollow portion and contacts the ridge at the mouth. The base lies flat against one pipe surface, either an inner or outer surface of the pipe. It is located at or near its final position on one of the pipes before the two pipes are brought together. As the pipes are telescoped over the gasket, the pipe on which the base is not located, first makes contact with the gasket at the rear of the arch, and as is moved forward the arch in the extensible portion of the gasket is flattened and this portion is extended by sliding over the ridge at the mouth as the gasket is squeezed between the two pipes and the cross-sectional area of the hollow is reduced and substantially or entirely obliterated. The lowering of the arch causes the extensible portion to teeter about the area which contacts the ridge, and thereby raises the lip which is forward of the mouth and presses it against the forwardly moving pipe with ever greater pressure, so that when the pipes are brought to their final position this lip cannot be lifted from its position against the pipe by the force of liquid under any pressure—the greater the pressure of the liquid, the more firmly the lip is sealed against the pipe surface.

Simultaneously, if there is a lip on the base portion of the gasket, the forward movement of the extensible portion of the gasket over the ridge forces this lip on the base portion into ever tighter pressure contact with the pipe on which it is located, so that when eventually subjected to liquid under pressure, the greater the pressure the tighter the lip is sealed against this pipe surface. If there is no lip, the pressure of the arch portion over the ridge increases the pressure contact between the gasket and the pipe.

If the gasket is to be used to prevent infiltration of water or other liquid into the pipe, the base is positioned on the outer surface of one pipe and the mouth faces away from the interior of the pipe assembly. If the gasket is to be used to seal a joint in a pipe carrying liquid under pressure, the base of the gasket is placed on the inner surface of the outer pipe and the mouth faces the interior of the pipe.

In the double gasket which is used with an outer sleeve, two gasket portions with mouths facing one another are provided on a single base to provide a tight seal in a pipe carrying liquid under pressure.

The invention is further described in connection with the accompanying drawings, in which—

Figure 1:
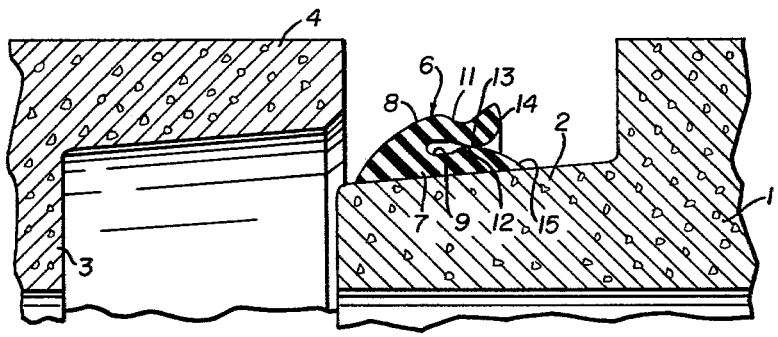
FIGURES 1 and 2 are sections through telescoping pipe ends showing a gasket on the spigot of a pipe, with an outwardly extending upper lip and a lower lip raised from the pipe surface before and after bringing the pipes together.
Figure 2:
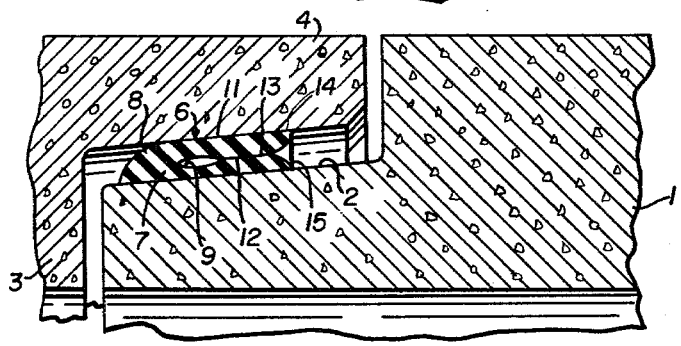

In FIGURES 1 and 2 the pipe section 1, formed with a spigot 2, telescopes into the pipe section 3, formed with a bell 4. The gasket 6 faces the exterior of the pipe and prevents the entrance of liquid. It comprises the base portion 7 which clings to the spigot 2, and the extensible arch portion 8. Together they form the annular hollow 9. The forward end of arch 11 of the extensible portion rests on the ridge 12 at 13, and then turns up into the lip 14, at its forward end. The forward end of the base portion terminates in the lip 15.

Figure 4:
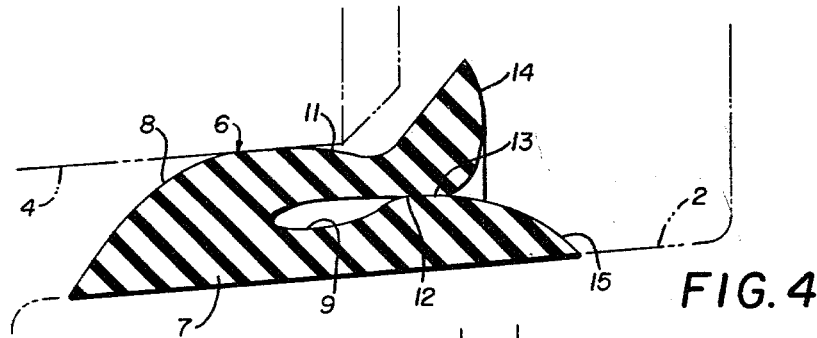
Figure 5:
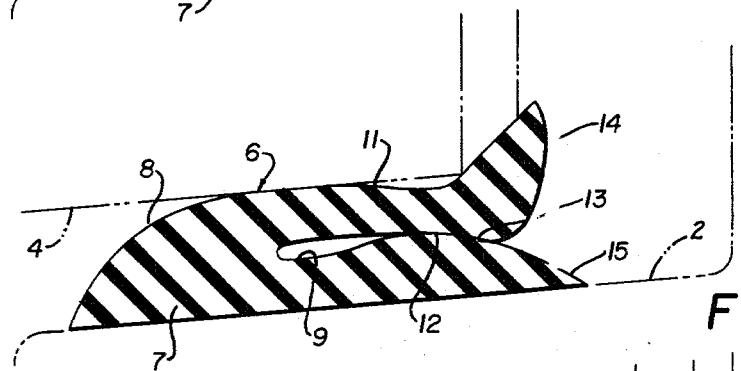
Figure 6:
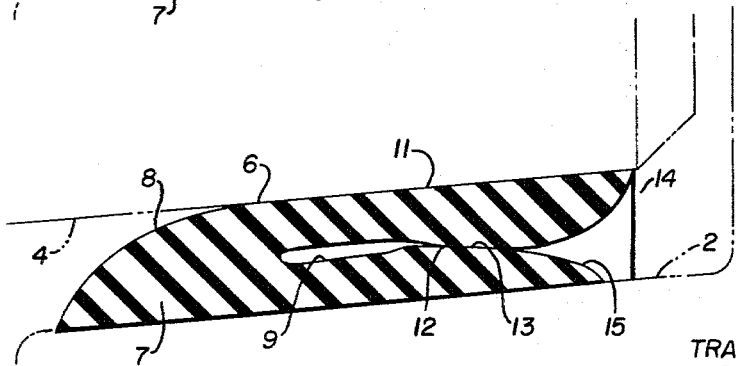

FIGURES 3–6 show the distortion of the gasket 6 as the pipes are telescoped over it. As the outer pipe first makes contact with the gasket, it usually makes a decided hump on the surface of the arch (FIGURE 3), and then this is flattened out (FIGURE 4). As the arch is flattened, the area 13 where the extensible portion of the gasket rested on the ridge 12 is extended forward so that it makes contact with the ridge somewhat forward of the original point of contact.

As telescoping proceeds, the area 13 moves farther forward. As the arch is depressed, its forward portion teeters on the ridge 12; as the arch to the rear of the ridge is depressed the lip is raised. FIGURE 4 illustrates this, and shows that as the pipe 2 is advanced the lip 14 is brought into increasingly greater pressure contact with it. The greatest pressure of the lip against the pipe is at its tip, and the tip hugs the pipe so tight that when subjected to liquid under pressure, the greater the pressure the tighter the seal. There is no opportunity for any liquid outside of the pipe to infiltrate between the gasket and this pipe surface.

As the telescoping of the pipes progresses the pressure of the arched extensible portion of the gasket on the ridge 12 increases. The ridge is flattened out, and generally the friction of the extensible arch portion of the gasket on the ridge as it is pressed forward, moves the surface of the ridge forward pressing the lip 15 into ever greater pressure contact with the spigot 2. When the assembly has been completed and the gasket is subjected to the pressure of liquid outside of the pipe, the greater the liquid pressure the greater the pressure of the lip against the pipe. There is no possibility of liquid infiltrating into the pipe between either lip and the pipe against which it is pressed.

Figure 7:
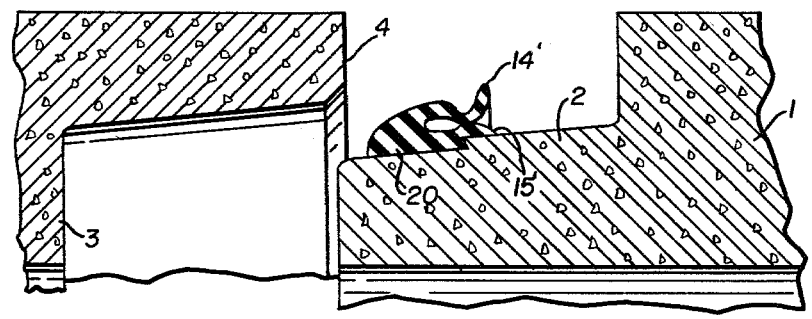
FIGURES 7 and 8 are sections through identical pipe structures showing a different gasket with a portion embedded in the spigot, and showing the gasket and pipes before and after bringing the pipes together.
Figure 8:
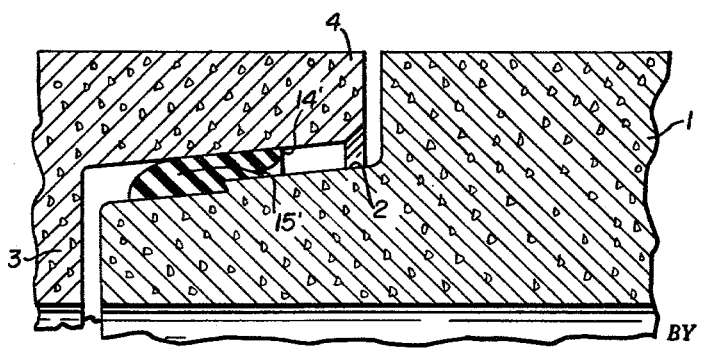
Figure 3:
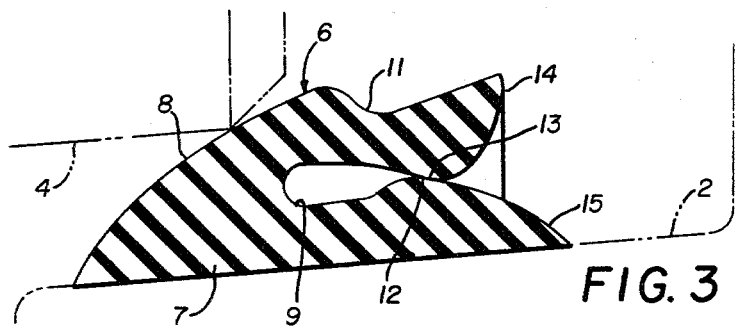
FIGURES 3 to 6 are enlarged views showing in greater detail the action of the gasket of FIGURES 1 and 2 as the two pipes are telescoped over it.

Identical pipe sections 1 and 3, with spigot and bell, 2 and 4, are shown in FIGURES 7 and 8. The gasket differs in that the rear 20 of the base is inset in the spigot 2 when the pipe is manufactured, and the lip 15 rests on the spigot and is pressed tight against it when the pipes are telescoped. By embedding the part 20 of the base in the spigot, the gasket is prevented from shifting its position on the spigot as the pipes are telescoped, as it might when its position is dependent on friction only, as in the structure illustrated in FIGURES 1 and 2. Also, FIGURES 7 and 8 illustrate a thinner lip 14' on the extensible portion of the gasket. It functions in the same manner as the thicker lip, illustrated in FIGURES 3 to 6.

Figure 9:
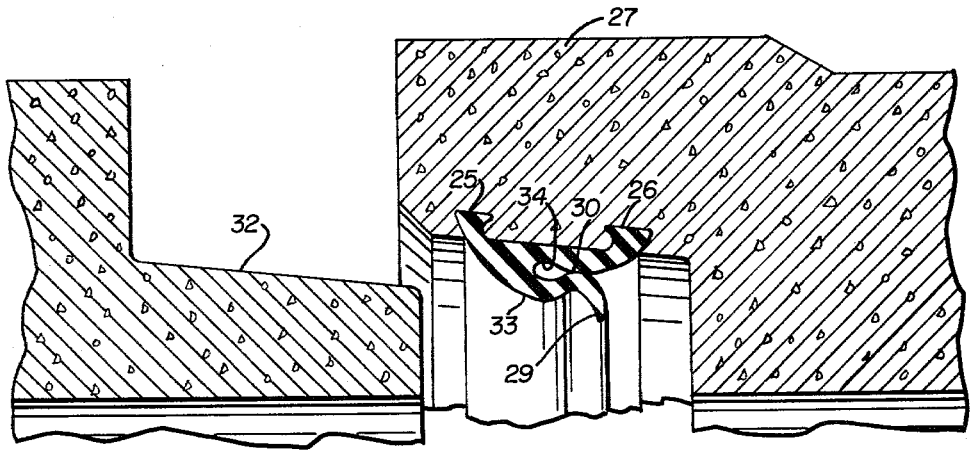
FIGURES 9, 10 and 11 show a gasket cast in the bell of one pipe and the telescoping end of another pipe in position for assembly, partially assembled, and completely assembled.
Figure 10:
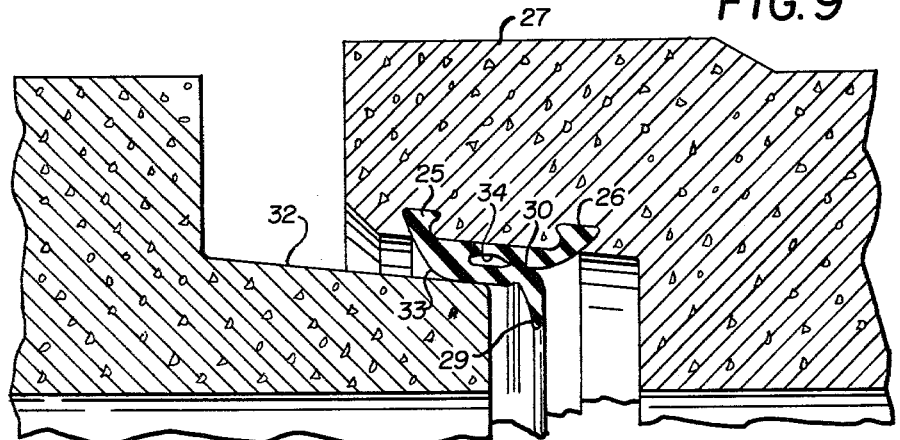
Figure 11:
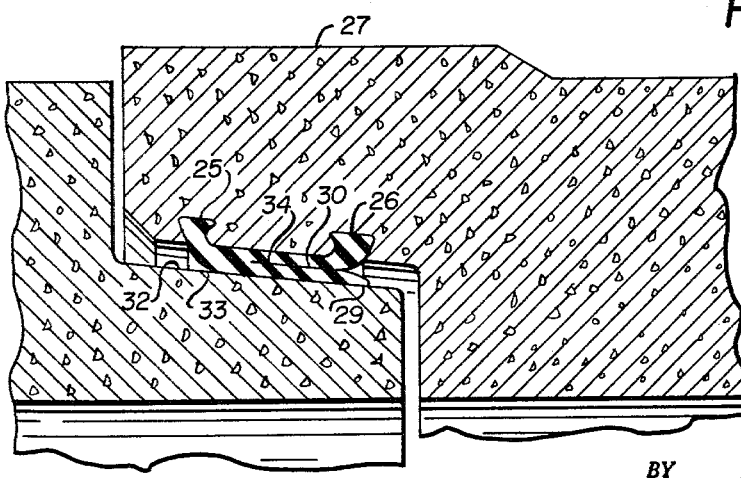

FIGURES 9 to 11 show a gasket with legs 25 and 26 cast in the inner surface of the bell 28 of a pipe. The gasket faces the interior of the pipe and is used in a pipe line carrying liquid under pressure. The lip 29 of the gasket is not unlike the lip 14 of the gasket in FIGURES 1 and 2 except that it extends toward the inside of the pipe instead of the outside. It is noted that the base portion of this gasket comprises no lip. The lip 29 is pressed against the ridge 30. As the spigot surface 32 presses against arch 33, the hollow 34 is entirely obliterated and the lip 29 is pressed into ever tighter contact with surface 32. The leg 26 (as well as leg 25) is embedded in the bell 27 as the pipe is manufactured, so there is no possibility of liquid seeping out under the base of the gasket, particularly as the increasing pressure of the telescoping pipes forms an ever tighter seal. Thus the lip at the front of the base portion of the gasket is unnecessary, and is omitted in the gasket shown in FIGURES 9–11.

A gasket similarly constructed with legs can be embedded in the surface of the spigot of a pipe. Alternatively, a gasket of the invention such as illustrated in FIGURES 1 to 6, with a base somewhat longer than the circumference of the internal surface of a bell, can be snapped into position on the surface of the bell of a pipe in a manner not uncommon with gaskets of known construction.

Figure 12:
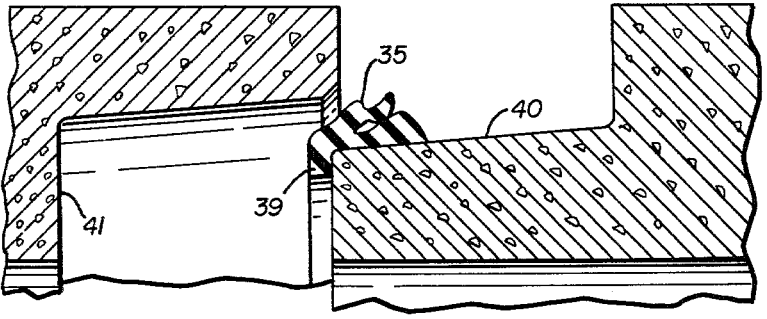
FIGURES 12 and 13 are sections through two pipes showing a different type of gasket with an inwardly projecting locating edge, both before and after the pipes have been telescoped.
Figure 13:
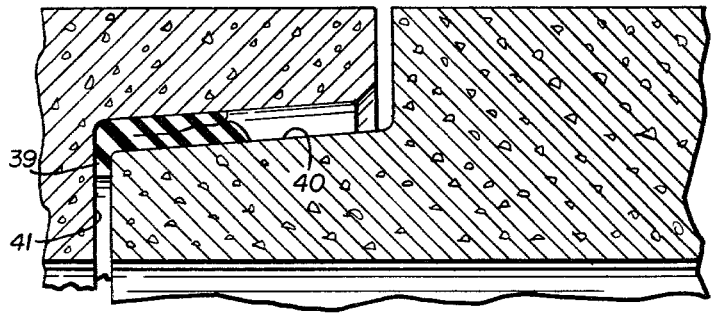

The gasket of FIGURES 12 and 13 differs from those shown in FIGURES 1 to 4 in that it includes a bead 30 on the extensible arch portion of the gasket and also includes the inwardly extending locating edge 39 which fits over the end of the spigot 40 and is brought into sealing contact with the abutting end 41 of the other pipe. Such a locating edge to maintain a gasket in position is a common expedient. It may extend over the end of a spigot, as shown, or if the gasket is on the inner face of the bell, it may extend over the end of the bell. It prevents the position of the gasket from being changed as the pipes are telescoped.

Figure 14:
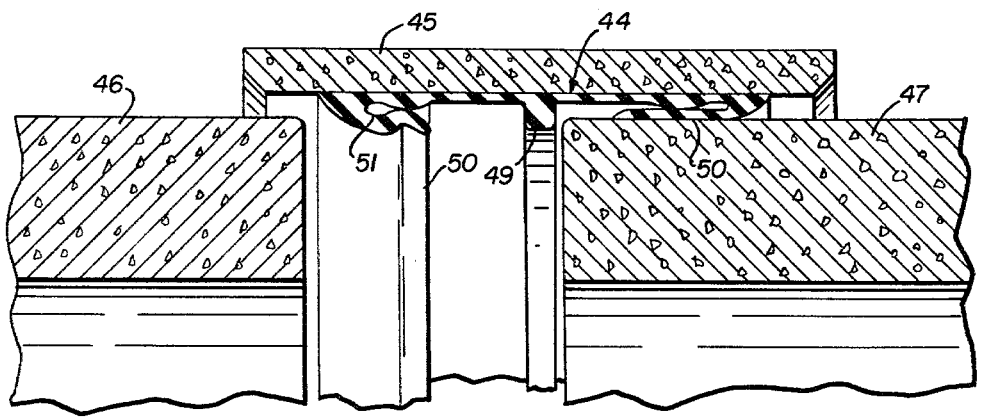
FIGURE 14 shows two pipe ends and a sleeve coupling with a double-ended gasket with one pipe in one edge of the sleeve and the other pipe entering the other edge of the sleeve.

FIGURE 14 illustrates the use of a double gasket 44 between an external sleeve 45 and two pipe ends 46 and 47. The opposite edges of the gasket are each formed with an inwardly facing mouth and lip. As the pipes are telescoped into the sleeve against the abutment 49 the arched portions are extended and the lips 50 are forced into ever greater contact with the pipe ends, as explained. The hollows 51 may disappear altogether. There is no lip on the base portion of the gasket. The area of contact between the base portion and the sleeve is great and there is little chance of seepage of liquid adjacent the sleeve, especially as each edge of the gasket is squeezed under substantial pressure.

The gaskets shown are illustrative. They may be cemented or vulcanized to one of the pipes, although they will generally be entirely separated from both pipes.

The invention is covered in the claims which follow.

What I claim is:

1. A gasket of elastomeric material with a base portion adapted to fit against a pipe surface, and an extensible portion which includes an arch which with the base portion forms a hollow, a ridge on the base portion which rises from the hollow, on which ridge the forward portion of the arch rests forming a mouth, a lip on the extensible portion forward of the mouth which tapers to a tip at its forward end which is directed away from the base portion, whereby when the arch is flattened by squeezing from the rear the extensible portion is extended forward and teeters about the area making contact with the ridge as said area is moved forward on the ridge, causing the tapered tip of the lip to move away from the base portion.

2. The gasket of claim 1 which is annular, the hollow and lip being annular.

3. The gasket of claim 1 with a lip on the base portion forward of the mouth which tapers to a tip with its under surface adapted to be pressed into contact with the pipe surface as the gasket is squeezed.

4. The gasket of claim 1 with two portions as defined therein and with a single base portion joining the base portions thereof.

5. An annular gasket with a generally rectangular cross section, a mouth at one side surface with two thick lips, the outer lip being undercut at its inner edge so that it is forwardly extensible, and a hollow to the rear of the mouth which is completely enclosed.

6. The process of forming a seal between adjacent ends of first and second pipes while telescoping over an annular gasket between them, which gasket comprises a base portion located on the first pipe and an extensible portion arched therefrom from the rear into contact with a ridge toward the front of the base portion, with an annular hollow between said portions to the rear of the ridge and a lip on the extensible portion tapering to a tip which lip is immediately forward of the area of said extensible portion which contacts the ridge, with the extensible portion teeterable on said ridge so as to raise and lower the lip as the arch is depressed, which process comprises moving the second pipe into contact with the rear of the arch and in doing so squeezing the gasket and extending the extensible portion forward and moving forward the area thereof which contacts the ridge and teetering that part of the extensible portion on the ridge and pointing the lip into the path of the forwardly moving second pipe and pressing it flush into contact with the second pipe.

References Cited in the file of this patent
UNITED STATES PATENTS 3,020,054    Driancourt _____ Feb. 6, 1962

FOREIGN PATENTS 557,047    Belgium _____ May 15, 1957